United States Patent Office 3,084,017
Patented Apr. 2, 1963

3,084,017
DYED CELLULOSIC TEXTILES AND PROCESSES
FOR THEIR PRODUCTION
Wilson A. Reeves and George L. Drake, Jr., Metairie, and John D. Guthrie, New Orleans, La., assignors to the United States of America as represented by the Secretary of Agriculture
No Drawing. Filed Aug. 24, 1960, Ser. No. 51,755
6 Claims. (Cl. 8—54.2)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to coloring cellulosic products and to processes for the production of these colored products. This invention is particularly useful for the production of dyed textiles.

In general, this invention relates to a new method of attaching dyes by chemical bonding to cellulosic material. The attachment of dyes to cellulose in accordance with this invention is accomplished by the reaction of aziridinyl groups with halotriazines and cellulosic hydroxyls. Dyes attached to cellulose by this method are very durable to repeated launderings.

In general the products of this invention are prepared by impregnating cellulosic materials with a soluble halotriazine dye derivative and a compound which contains two or more 1-aziridinyl groups and then drying. In this process the chlorotriazine reacts with the 1-aziridinyl compound to produce an addition product. In this addition product the triazine group is attached to the nitrogen originally in the 1-aziridinyl compound through a carbon to nitrogen covalent bond. This reaction is illustrated with carbonyl bis(1-aziridine) and a chlorotriazine:

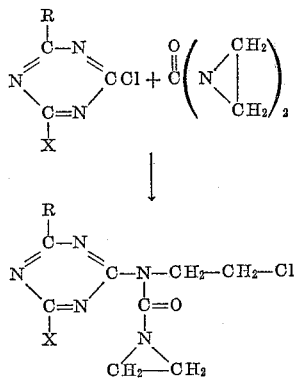

In the above formulas, R represents a halogen or the group NaSO$_3$-Dye-NH—, and X is a halogen from the group consisting of chlorine, bromine, and fluorine.

The attachment of the dye to cellulose is achieved through a second reaction which may be illustrated by the following reaction:

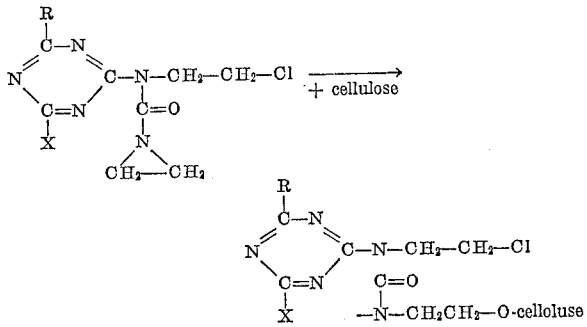

where X and R have the same meanings as above.

A particular feature of this new dyeing technique is that it constitutes a chemical modification of cellulose. It is not important whether the 1-aziridine compound reacts with the cellulose first or with the chlorotriazine first. The products of this invention are characterized by the following chemical connecting structure:

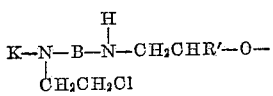

wherein,

K is a halotriazine derivative;
B is a carbon or a pentavalent phosphorus atom;
O is the oxygen of a cellulose hydroxyl; and
R' is a member of the group consisting of H or CH$_3$.

Another feature of this invention is that it provides colored cellulosic products that can undergo embossing, and other similar processes. Other objectives of the invention will be apparent to those skilled in the art as the description of the invention proceeds.

Dyes which contain a chlorotriazine grouping with an active chlorine atom have been used previously for dyeing cellulosic products. In these cases the reaction is carried out using alkali metal salt catalysts and the resulting product is joined directly to the cellulose through an ester type connecting linkage. Ester linkages are inherently weak under hydrolytic conditions.

1-aziridinyl compounds suitable for use in this invention are compounds that contain the following structure:

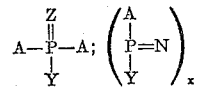

and

wherein Z is oxygen or sulfur; A is

or

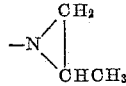

Y is a member of the group consisting of

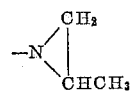

a dialkyl amine, an alkyl radical, and an aryl radical and where $x$ is an integer of 3 to 6. Some typical examples are:

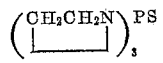

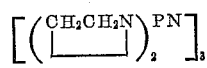

and

These 1-aziridinyl compounds can be prepared by substantially any of the known processes for producing such compounds. In general, they can be prepared by reacting ethylenimine or carbon substituted ethylenimine with the corresponding metaloid halides such as phosphoryl chloride or phosgene in the presence of an acid acceptor such as trimethyl amine.

Halotriazines suitable for use in this invention are compounds that contain the following structure:

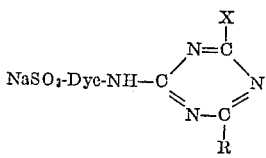

wherein R is a member of the group consisting of NaSO₃-Dye-NH—, a halogen and

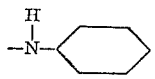

and X is a halogen selected from the group consisting of chlorine and bromine, or fluorine. These compounds may be produced by combining a soluble azo or anthraquinone dye that contains an amino group with cyanuric chloride. The manner in which the halotriazines are made do not in any way limit their utility in this invention. The product contains one or two reactive halogen atoms. They readily combine with aziridinyl compounds by opening the aziridine ring wherein the chlorine atom becomes durably bound in a haloethyl group. The halotriazines suitable for use in this invention must be soluble in the presence of dissolved aziridinyl compounds. Some examples of suitable chlorotriazines are given below but the invention is not limited to these examples.

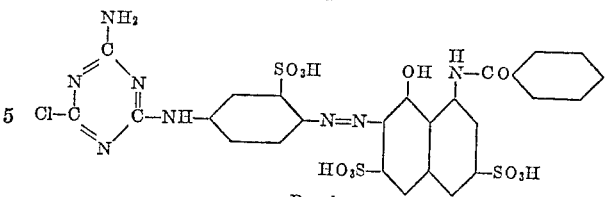
Purple

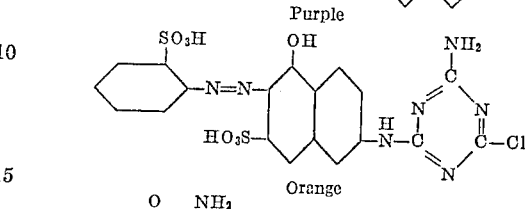
Orange

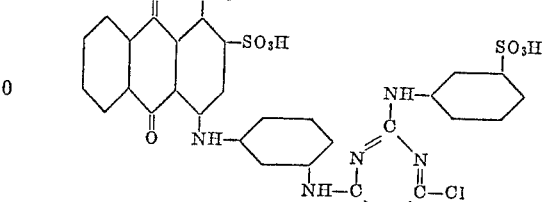
Blue

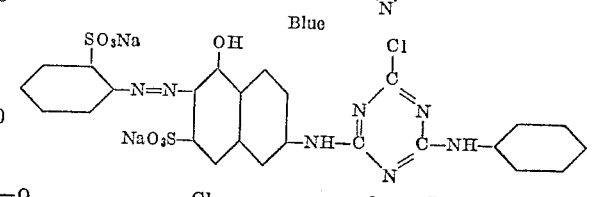

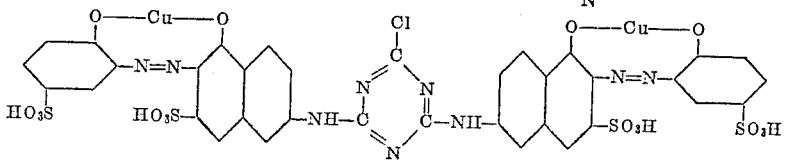

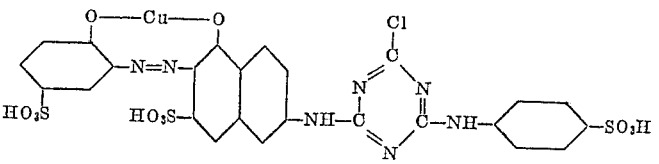

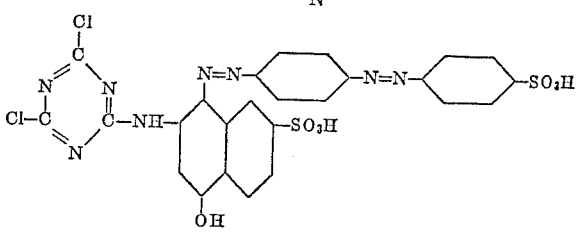

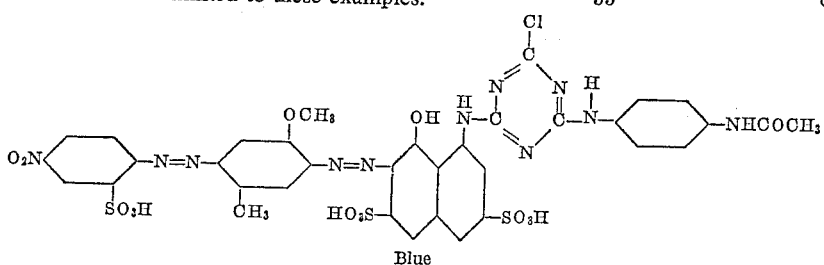
Blue

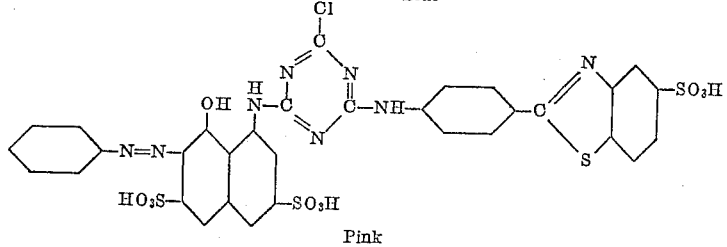
Pink

The reaction can proceed in acidic, neutral or alkaline conditions. Surface active agents, water repellents, and other textile agents may be incorporated into the solution to modify the treated textiles. The solutions of halotriazine dye derivative and the 1-aziridine compound can be caused to react in the absence of cellulose to produce a highly colored thermosetting resin.

The proportion of reactants can be varied widely depending, for example, on the particular properties desired in the final textile product. The amount of chlorotriazine dye used will be dependent upon the amount of aziridinyl compound used and upon the intensity of the color desired. The maximum proportion of chlorotriazine dye that can be efficiently utilized in this process is that amount which will provide one reactive halogen per two aziridinyl groups present in the system. Dye used in excess of this amount will not become thoroughly fixed and will wash out by water rinsing. The concentration of dye in the system can be varied to produce the desired shade of color. The 1-aziridinyl compounds are not reducing agents and hence do not alter the shade of the dye. Alteration of the dye shade is an adverse feature that characterizes systems that contain or have the potentiality of releasing reducing agents (i.e. formaldehyde). Usually this can be accomplished by using from about .5% up to 5% dye.

The amount of 1-aziridinyl compound used in this invention can be varied from about 1% up to about 20% of the weight of the textile. The amount of aziridine compound that is to be used will be dependent upon the fabric properties desired. The aziridinyl compounds not only react with the chlorotriazine dyes, but also react with the cellulose and in so doing modify the cellulosic properties. Reaction of the aziridinyl compounds with cellulose leads to crosslinking of cellulose molecules and therefore provides dimensional stability, wrinkle resistance, and rot resistance. Flame resistance is also imparted to textiles when the 1-aziridinyl compound contains phosphorous. For maximum wrinkle resistance in a textile, about 4 to 12% of the 1-aziridinyl compound is usually needed; however, quite noticeable improvements in fabric stability, rot resistance, and wrinkle resistance can be produced with as little as 2% weight add-on of the 1-aziridinyl compound. Cellulosic textiles prepared in accordance with this invention are characterized by having dimensional stability, rot resistance, wrinkle resistance, and a durable color.

In practicing this invention, the reaction of the 1-aziridinyl compound and the chlorotriazine dye with cellulose is carried out by moistening the cellulose with a solution of the compounds and then drying. The manner in which the textile is dried is not an important part of this invention. This invention can be carried out using conventional textile finishing equipment. For example, a cellulosic textile to be treated can be padded in a solution containing the chlorotriazine dye and 1-aziridinyl compound and then dried and cured in an oven. When this process is used, both the drying and curing can be carried out in a single step. It is not necessary that the curing step be used because the dye becomes fixed to the cellulose by merely drying the wet textile. The drying and curing operation can be carried out at temperatures ranging from about room temperature up to about 180° C. The preferred reaction temperature is between about 130° and 160° C. for times ranging from about 2 minutes up to about 6 minutes. This preferred range of reaction time and temperature also provides the maximum amount of dimensional stability, rot and wrinkle resistance to cellulosic textiles. All cellulosic textiles prepared in accordance with this invention are insoluble in cuprammonium hydroxide solutions.

This process can suitably be carried out in a number of solvents. The 1-aziridinyl compounds as well as the chlorotriazine dyes are soluble in water and organic liquids such as benzene, ethanol, methanol and dimethylformamide. The reaction can be carried out in these solvent systems. Often the solubility of the chlorotriazine in a particular solvent is increased by the presence of the 1-aziridine compound. The preferred solvent is water which swells cellulose and allows thorough penetration by the reagents.

This invention is useful in producing dyed cellulosic goods including rayon and cotton textiles both woven and nonwoven and for dyeing blends of these cellulosic fibers with noncellulosic synthetic fibers. It is useful for the production of colored or dyed paper. Paper treated by the process has improved wet strength. Wool fibers are also quite conveniently dyed by this process. The dye is attached to the wool fiber in a manner to provide extreme durability to laundering and dry cleaning.

Glass fibers are also conveniently dyed by this process. The dye is attached to the glass fiber in a manner to provide extreme durability to laundering and drycleaning.

Some of the outstanding features in practicing this invention are as follows: The solutions containing reactive reagents described herein are quite stable and can be left several days without loss of utility. The color reagent that is not combined with the cellulosic fiber during the drying and curing operation can easily and quickly be removed by water rinsing. The dyes produce shades of outstanding brilliance. Because of the chemical linkage of the dye to cellulose fibers by stable covalent bonds the dyestuff has outstanding wet fastness. Even after several washes with hot soapy water, the loss of color is very slight. The dyed textile is unaffected by drycleaning solvents. The light fastness of the dyed fabrics is also good. Treated fabrics have improved dimensional stability, rot resistance, and wrinkle resistance. The amount of wrinkle resistance is dependent upon the amount of aziridinyl compounds used. With low amounts of 1-aziridinyl compounds such as about 1 or 2%, a low degree of wrinkle resistance is obtained but with about 6 to 8% weight add-on of the 1-aziridinyl compound on cotton fabrics and about 8 to 12% on rayon fabrics, a very high degree of wrinkle resistance is obtained. When the 1-aziridinyl compound contains phosphorous, the finished textile also has flame resistance and glow resistance.

The following examples are given by way of illustration and do not constitute in any way a limitation of the invention. All parts and percentages are by weight. For convenience, the compound tris-(1-aziridinyl)phosphine oxide is referred to as APO and tris-(2-methyl-1-aziridinyl)phosphine oxide is referred to as MAPO. Also, 1,1,3,3,5,5-hexa-(1-aziridinyl)phosphonitrilate is referred to as APN.

EXAMPLE 1

80 x 80 cotton print cloth was processed through the aqueous solutions listed in Table I. Each solution, 1 through 9, consisting of tris(1-aziridinyl)phosphine oxide (APO) and a red chlorotriazine dye containing one active chlorine group. Solutions 10 through 12 consisting of dye and water only.

Table I

| Solution Number | Percent APO | Percent Reactive Dye | Percent $H_2O$ | pH of Solution |
|---|---|---|---|---|
| 1 | 1.0 | 0.5 | 98.5 | 7.1 |
| 2 | 1.0 | 1.0 | 98.0 | 6.9 |
| 3 | 1.0 | 3.0 | 96.0 | 6.7 |
| 4 | 5.0 | 0.5 | 94.5 | 7.5 |
| 5 | 5.0 | 1.0 | 94.0 | 7.2 |
| 6 | 5.0 | 3.0 | 92.0 | 7.0 |
| 7 | 10.0 | 0.5 | 89.5 | 7.6 |
| 8 | 10.0 | 1.0 | 89.0 | 7.6 |
| 9 | 10.0 | 3.0 | 87.0 | 7.4 |
| 10 | 0.0 | 0.5 | 99.5 | 7.2 |
| 11 | 0.0 | 1.0 | 99.0 | 7.0 |
| 12 | 0.0 | 3.0 | 97.0 | 6.7 |

The samples were padded through the above solutions using 2 dips and 2 nips with a tight squeeze roll pressure to a wet pick-up of about 68%. The samples were dried for 4 minutes at 80–90° C. and cured for 4 minutes at 140° C. They were then washed in hot tap water for 30 minutes, given one laundering, using a neutral detergent, in an automatic washer and dried in an automatic electric clothes drier. After washing and drying the samples had an increase in weight from 0.7 to 3.5%. The colors ranged from practically white for the samples treated with solutions 10, 11 and 12 to dark brilliant reds using solutions 1 to 9. Increasing the concentration of the APO and dye usually increased the depth of color. The sample resulting from the treatment with solution 9 had a resin add-on of 3.5% and a warp wrinkle recovery angle of 112°. Wrinkle recovery angle was determined with the Monsanto wrinkle tester. Untreated fabric had a wrinkle recovery angle of 75°. Sample 7 contained 2.1% add-on and had a crease recovery angle of 98% in the warp direction. Samples resulting from the treatment with solutions 1–9 had a black ash when subjected to a flame. After 5 home launderings the colors of the fabric were essentially unchanged.

EXAMPLE 2

A sample of 80 x 80 print cloth was processed as per Example 1 using solution number 9 from Table I which had aged for 24 hours. The sample after treatment had a weight increase of 4.4%. The color was a bright dark red which was fast to laundering and on burning left a black ash. The sample was wrinkle resistant and contained 0.2% chlorine after 5 launderings in a conventional home type automatic washer and dryer.

EXAMPLE 3

Samples of 80 x 80 print cloth were wet out in an aqueous solution containing 10% APO, 5% of a red chlorotriazine dye containing one active chlorine group and 85% water. The padding and washing procedure was the same as per Example 1 but the drying and curing was performed as per Table II.

*Table II*

| Sample Number | Dry Time, Minutes | Dry Time, °C. | Cure Time, Minutes | Cure Temperature, percent | Percent Add-On | Crease Resistance in Degrees (Warp) |
|---|---|---|---|---|---|---|
| 1 | 4 | 80–90 | 1 (week) | 30 | 0.7 | |
| 2 | 4 | 80–90 | 4 | 120 | 0.7 | |
| 3 | 4 | 80–90 | 4 | 130 | 2.1 | |
| 4 | 4 | 80–90 | 4 | 140 | 2.2 | |
| 5 | 4 | 80–90 | 4 | 150 | 3.6 | 114 |
| 6 | 4 | 80–90 | 4 | 160 | 6.0 | 129 |
| 7 | 4 | 80–90 | 2 | 170 | 6.0 | 124 |
| 8 | 0 | 0 | 2 | 170 | 4.2 | 117 |

Weight add-ons of from 0.7 to 6.0 were obtained. Brilliant dark red colors were obtained which were durable to laundering. On ignition a black char was formed.

EXAMPLE 4

A sample of 80 x 80 cotton print cloth was treated with a solution as used in Example 3 except it also contained 7% $Zn(BF_4)_2$ based on the weight of APO. The sample was padded, dried, cured, and washed as per Example 1. The sample had a weight increase of 3.7%, was a brilliant red in color and had a warp wrinkle recovery angle of 115°. The color was durable to repeated laundering, was very uniform and showed no evidence of crocking. On ignition a black ash resulted.

EXAMPLE 5

A sample of 80 x 80 cotton print cloth was treated with the same solution used in Example 3 except it contained 0.5% of a wetting agent. Processing was the same as listed in Example 4. Properties were equivalent to those obtained in Example 4.

EXAMPLE 6

Samples of 80 x 80 cotton print cloth were treated as per Example 1 except the dye used was a red chlorotriazine containing two active chlorine groups. Weight add-ons ranging from 0.8% to 4.5% were obtained. pH of the solutions ranged from 5.8 to 6.5. There was essentially no bleeding of the dye on washing, samples were wrinkle resistant and the colors were fast to repeated launderings. The colors were uniform, and there was no crocking. On ignition the samples burned slowly leaving a black ash.

EXAMPLE 7

Samples of 80 x 80 print cloth were treated with a solution consisting of 10% APO and 3% of a dichlorotriazine dye using the procedure as per Example 1. A yellow, orange, and blue dye was used. Weight add-ons of 3.6, 5.2, and 4.4 respectively were obtained. All colors were bright and durable, samples were wrinkle resistant, had a very good hand and were insoluble in cuprammonium hydroxide.

EXAMPLE 8

Samples of cotton fabric were processed as per Example 7 except a yellow, orange, and blue chlorotriazine dye containing only one active chlorine group was used. pH of the solutions and add-ons respectively were 6.9, 9.0, 8.0, and 2.9, 2.9, 3.0. The fabrics were dyed dark colors.

EXAMPLE 9

A sample of 80 x 80 cotton print cloth was padded as per Example 1 using a solution containing 10% APN [1,1,3,3,5,5-hexa-1-aziridinyl phosphonitrilate] and 3% of a red chlorotriazine dye containing one active chlorine group. The wetted sample was dried for 4 minutes at 80–90° C. and cured for 4 minutes at 160° C. Washing was done as per Example 1. A dry add-on of 7.2% was obtained. The sample had a brilliant dark red color, which was resistant to repeated washings and had a warp wrinkle recovery angle of 131° using the Monsanto wrinkle recovery tester.

EXAMPLE 10

The same experiment as listed in Example 9 was repeated using MAPO [tris(2-methyl)-1-aziridinyl phosphine oxide] in place of the APN. Solution pH was 6.9 and a weight increase of approximately 1% was obtained. The fabric was a brilliant medium red.

EXAMPLE 11

A sample of filter paper was processed as per Example 9 using a solution consisting of 20% APO, 2% red chlorotriazine dye containing two active chlorine atoms, 1% $Zn(BF_4)_2$, 0.2% wetting agent and the remainder water. The pH of the solution was 6.6. The wet pick-up was 110%, and after finishing had a weight increase of 18.4% and was highly flame resistant as it would pass the 135 degree angle flame test after washing. The wrinkle recovery angle was 220° (W+F) as opposed to 107° for the untreated control. The sample had improved wet strength, was a brilliant red in color and the color was durable to repeated launderings.

EXAMPLE 12

A sample of 80 x 80 print cloth was processed through the solution listed in Example 11 using the same procedure. A wet pick-up of 76% was obtained and a resin add-on of approximately 12% resulted. The wrinkle recovery angle was 253° (W+F), the fabric was flame resistant and was a brilliant red color. The color was durable to repeated laundering and drycleanings. The sample was insoluble in cuprammonium hydroxide and was rot and mildew resistant.

EXAMPLE 13

A sample of rayon worsted fabric (woven from 15 singles yarn, yarn spun from 3 denier delustered 4½ in. length viscose staple) was processed with the same solution and procedure listed in Example 11. A wet pick-up of 67% was obtained with a resulting final dry weight add-on of 10.9%. The fabric was flame resistant, crease resistant, brilliant red in color, durable to repeated launderings and dry-cleanings.

EXAMPLE 14

A sample of 8 oz. twill fabric was processed through a solution composed of 33% APO, 2% of a red chlorotriazine dye, 5% $Zn(BF_4)_2$ (based on the weight of APO used), 0.2% wetting agent and the remainder water (pH of solution=6.7). Padding, processing and washing was done as per Example 11. A wet pick-up of 70% was obtained with a dry weight add-on of 22.4%. The sample was flame resistant (passing the 180° angle in the strip flame test), glow resistant, mildew and rot resistant, dimensionally stable, was a brilliant red in color, durable to repeated washing and drycleanings and was crease resistant.

EXAMPLE 15

A sample of wool, 6.6 oz./yd., was treated as per Example 11. The wet pick-up was 81% and the dry weight add-on after processing was 10.4%. The fabric was red in color, would pass the 180° angle in the strip flame test, had a very good hand and the fabric was dimensionally stable to washing and drycleaning.

EXAMPLE 16

A sample of glass fabric, 8.7 oz./yd., was treated as per Example 11. The wet pick-up was 16% and the dry weight add-on was approximately 1%. The fabric was red in color which was durable to washing and drycleaning.

We claim:

1. A process for dyeing cellulose and therewith chemically bonding the dye to the cellulose with linkages represented by the structure:

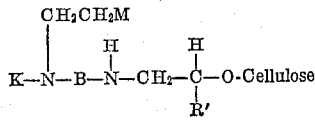

wherein K is a triazine dye, B is a member of the group consisting of carbonyl, phosphoryl, and thio phosphoryl, —M is a halogen and R' is a member of the group consisting of H—, and CH₃— comprising impregnating the cellulose with an aqueous solution containing a halotriazine dye and a 1-aziridine compound and drying the impregnated cellulose.

2. A process for dyeing cellulose comprising cellulose with an aqueous solution containing about from .5 to 5.0% of a halotriazine dye, about from 1 to 20% of a 1-aziridine compound and drying the impregnated cellulose at a temperature of from 130° to 160° C. for a period of from 2 to 6 minutes, the longer time intervals being employed with the lower temperatures.

3. The process of claim 2 wherein the 1-aziridine compound is tris(1-aziridinyl) phosphine oxide.

4. The process of claim 2 wherein the 1-aziridine compound is tris(2-methyl-1-aziridinyl) phosphine oxide.

5. The process of claim 2 wherein the 1-aziridine compound 1,1,3,3,5,5-hexa(1-aziridinyl) phosphonitrilate.

6. Colored cellulose in which a triazine dye is chemically bonded to the cellulose by linkages represented by the structure

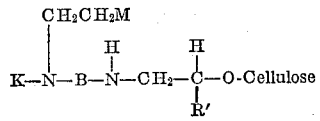

wherein K is a triazine dye, B is a member of the group consisting of carbonyl, phosphoryl, and thio phosphoryl, —M is a halogen and R' is a member of the group consisting of H—, and CH₃—.

References Cited in the file of this patent

UNITED STATES PATENTS

| | | |
|---|---|---|
| 2,719,156 | Benneville et al. | Sept. 27, 1955 |
| 2,859,134 | Reeves et al. | Nov. 4, 1958 |
| 2,889,289 | Reeves et al. | June 2, 1959 |
| 2,891,877 | Chance et al. | June 23, 1959 |
| 2,911,325 | Drake et al. | Nov. 3, 1959 |
| 2,957,862 | Riat et al. | Oct. 25, 1960 |
| 2,971,815 | Bullock et al. | Feb. 14, 1961 |
| 3,038,776 | Chance et al. | June 12, 1962 |

OTHER REFERENCES

Broden et al.: Amer. Dyestuff Reporter, Jan. 4, 1954, pages P6–P13, particularly pages P8 and P9.